`(12)` United States Patent
Wang et al.

`(10)` Patent No.: US 9,035,519 B2
`(45)` Date of Patent: May 19, 2015

`(54)` ELECTRICAL ENERGY AND MECHANICAL ENERGY CONVERSION APPARATUS FOR VEHICLES

`(75)` Inventors: Yu-Chi Wang, Hsinchu (TW); Ren-Nien Jia, Hsinchu (TW)

`(73)` Assignees: Yu-Chi Wang, Hsinchu (TW); Kuo-Lin Chia, Hsinchu (TW)

`( * )` Notice: Subject to any disclaimer, the term of this patent is extended or adjusted under 35 U.S.C. 154(b) by 429 days.

`(21)` Appl. No.: 13/371,368

`(22)` Filed: Feb. 10, 2012

`(65)` Prior Publication Data

US 2012/0262016 A1    Oct. 18, 2012

`(30)` Foreign Application Priority Data

Apr. 15, 2011    (TW) .............................. 100113286 A

`(51)` Int. Cl.
| | |
|---|---|
| H02K 23/60 | (2006.01) |
| H02K 47/00 | (2006.01) |
| H02K 7/10 | (2006.01) |
| H02K 7/12 | (2006.01) |
| B60K 6/12 | (2006.01) |
| B60K 6/48 | (2007.10) |
| B60L 11/14 | (2006.01) |
| B60K 6/26 | (2007.10) |
| H02K 16/02 | (2006.01) |

`(52)` U.S. Cl.
CPC .. *H02K 7/12* (2013.01); *B60K 6/12* (2013.01); *B60K 6/48* (2013.01); *B60K 2006/262* (2013.01); *H02K 16/025* (2013.01); *B60L 11/14* (2013.01); *B60L 2220/52* (2013.01); *Y02T 10/7077* (2013.01); *Y02T 10/6282* (2013.01); *Y02T 10/641* (2013.01); *Y02T 10/6208* (2013.01); *Y02T 10/6221* (2013.01)

`(58)` Field of Classification Search
CPC ............. B06K 6/12; B06K 6/48; H02K 23/60
USPC ....... 310/98, 102 R, 103, 108, 109, 113, 121, 310/123, 115
See application file for complete search history.

`(56)` References Cited

U.S. PATENT DOCUMENTS

| | | | | |
|---|---|---|---|---|
| 4,496,016 A | * | 1/1985 | Unsworth et al. ........... | 180/53.6 |
| 6,501,190 B1 | * | 12/2002 | Seguchi et al. ................ | 290/46 |
| 2011/0000721 A1 | * | 1/2011 | Hassett et al. ............. | 180/65.22 |
| 2012/0220413 A1 | * | 8/2012 | Yang ............................. | 475/156 |

FOREIGN PATENT DOCUMENTS

| | | |
|---|---|---|
| CN | 2098753 U | 3/1992 |
| CN | 2618353 Y | 5/2004 |
| TW | 200631280 | 9/2006 |
| TW | I278165 | 4/2007 |
| WO | WO 2009103993 A1 * | 8/2009 |

* cited by examiner

*Primary Examiner* — Jose Gonzalez Quinones

`(57)` ABSTRACT

An electrical apparatus is provided. The electrical apparatus includes a first rotation device; a second rotation device co-axially disposed with the first rotation device for electromagnetically matching with each other; and a brake device connected to the second rotation device to constrain the second rotation device from a rotation.

10 Claims, 4 Drawing Sheets

ELECTRICAL ENERGY AND MECHANICAL ENERGY CONVERSION APPARATUS FOR VEHICLES

CROSS-REFERENCE TO RELATED APPLICATION AND CLAIM OF PRIORITY

This application claims the benefit of Taiwan Patent Application No. 100113286, filed on Apr. 15, 2011, in the Taiwan Patent and Trademark Office, the disclosures of which are incorporated herein in their entirety by reference.

FIELD OF THE INVENTION

The present invention relates to an electrical apparatus, and more particularly to an electrical apparatus for vehicles.

BACKGROUND OF THE INVENTION

Currently, under the trend of environmental protection and clean energy, the rolling stock using electricity and the gas/electrical hybrid vehicle (or called the gas/electrical energy vehicle) have gradually replaced the automobile to become the major transportation for people. The mechatronic structure of a conventional generator or motor for vehicles basically includes a rotor and a stator. The metal coil is disposed with the rotor, and the permanent magnetic is disposed with the stator. The permanent magnet provides the magnetic field. When exerting an external force to rotate the rotor, and drive the coil to cut the line of magnetic force, the current will be generated in the coil. Hence, the generator for vehicles can generate the electrical energy through torsion which comes from the rotary shaft, wherein the source of torsion often comes from the axle shaft or the transmission shaft of the generator (engine). When the current coming from the external power supply (such as a battery) flows into coils on the rotor, it produces the electromagnetic field which triggers mutual interaction between the electromagnetic field and the magnetic field of the permanent magnet, and induces rotation of the rotor to output the torsion That is how the electric motor operates. The same mechatronic structure utilizing different input/output circuit layouts may switch the vehicle apparatus mentioned above to a generator or motor device. Such mechatronic apparatus equipped on the vehicles may be switched to a generator or motor timely according to the power demand of the vehicle at that time.

The power shortage of the motor for vehicles is a problem that many car factories have to face currently; meanwhile, the performance of the generator still has room to be prompted. Briefly speaking, a generator or motor is an electro-mechanical apparatus which converts the mechanical energy into the electrical energy. However, the structure of the above-mentioned generator or motor only can provide very limited energy conversion efficiency. During the time when a vehicle is running, there is much wasted energy, such as the kinetic energy wasted when users step on the brake to decelerate, or the hydraulic power dismantled by the gear box. If the design of the generator or motor can be improved, the conversion efficiency of the mechanical energy into the electrical energy can be enhanced, and various existing energies can be properly utilized during the time when the vehicle is running, the power of the generator or motor can be enhanced and the effect of saving energy can be achieved.

In order to overcome the drawbacks in the prior art, an electrical apparatus for vehicles is provided in the present invention. The particular design in the present invention not only solves the problems described above, but also is easy to be implemented. Thus, the present invention has the utility for the industry.

SUMMARY OF THE INVENTION

In accordance with an aspect of the present invention, a motor generator apparatus for vehicles is provided. The motor generator apparatus of the present invention designs the stator of the conventional motor or generator as a moving stator which rotates around the rotor and is co-axially disposed therewith. This enables the rotor and the stator to rotate in opposite directions so that the mutual interaction resulting from the magnetic field is increased, thereby enhancing the efficiency of the motor generator apparatus.

In accordance with an aspect of the present invention, an electrical apparatus is provided. The electrical apparatus includes a first rotation device; a second rotation device co-axially disposed with the first rotation device for electromagnetically matching with each other; and a brake device connected to the second rotation device to constrain the second rotation device from a rotation.

In accordance with another aspect of the present invention, an electrical apparatus is provided. The electrical apparatus includes a first rotation device; a second rotation device co-axially disposed with the first rotation device for electromagnetically matching with each other; and a hydraulic device controlling the second rotation device.

In accordance with a further aspect of the present invention, an electrical apparatus is provided. The electrical apparatus includes a first rotation device; a second rotation device co-axially disposed with the first rotation device for electromagnetically matching with each other; and a control device controlling the second rotation device at one of a stop status and a rotating status.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
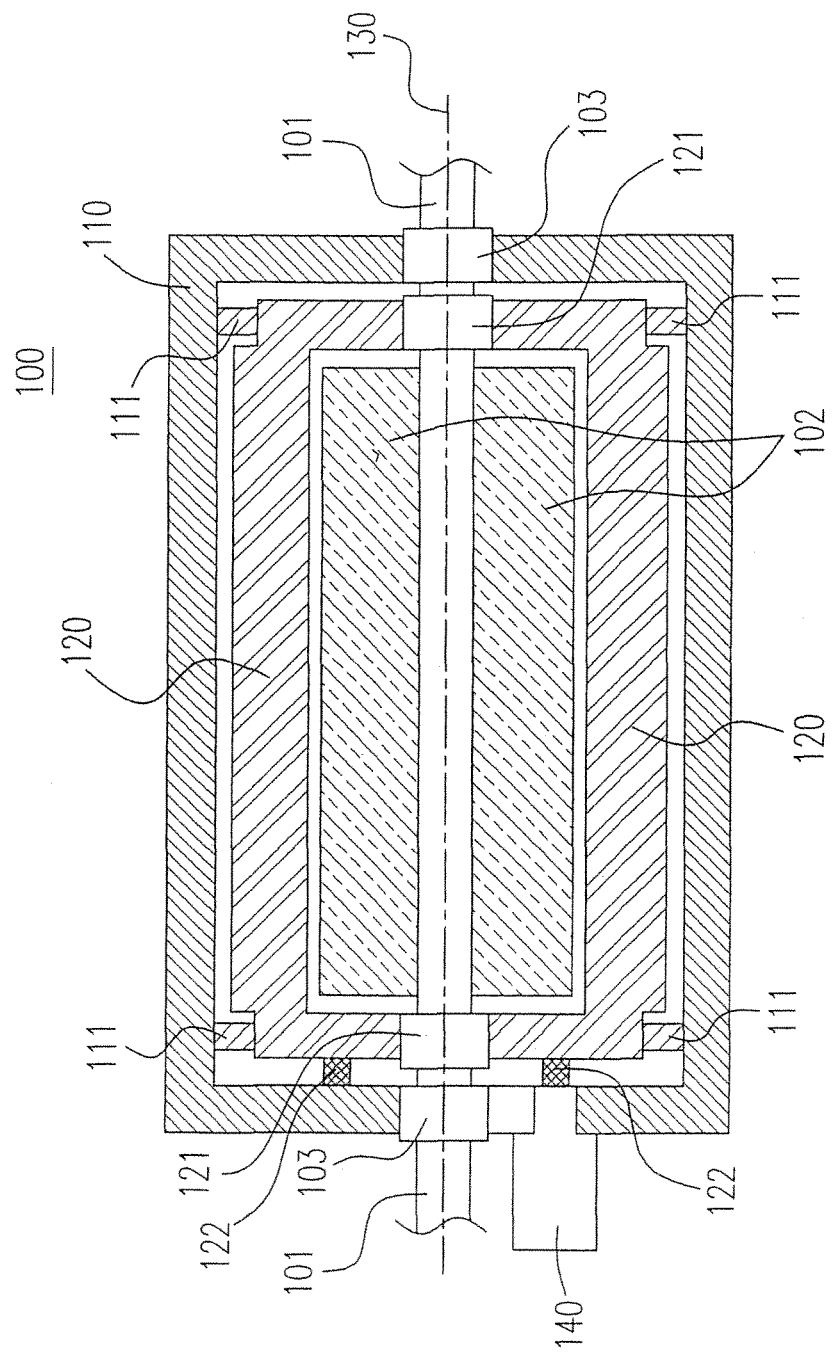
FIG. 1 is a cross-sectional diagram of a motor generator apparatus for vehicles according to an embodiment of the present invention.

Please refer to FIG. 1 which is a cross-sectional diagram of a motor generator apparatus for vehicles according to an embodiment of the present invention. The motor generator apparatus 100 includes a rotary shaft 101, a rotor 102, a pair of shaft bearings 103, a housing 110, a moving stator 120, and a pair of shaft bearings 121. The rotor 102 is disposed with the rotary shaft 101, and the rotary shaft 101 is disposed in the housing 110 through the shaft bearings 103. As shown in FIG. 1, the moving stator 120 in the housing 110 is disposed on the rotary shaft 101 through the shaft bearings 121. In accordance with a preferred embodiment of the present invention, the above-mentioned elements including the rotary shaft 101, the rotor 102, the shaft bearings 103, the moving stator 120 and the shaft bearings 121 are co-axially disposed on a shaft line 130. The skilled person may infer from FIG. 1 that the rotor 102 disposed with the rotary shaft 101 may rotate with the rotary shaft 101, and the moving stator 120 may rotate around the rotary shaft 101 in an identical direction or an opposite direction.

Since the rotor 102 and the moving stator 120 may move relatively to each other, if the permanent magnet is disposed on one of the rotor 102 and the moving stator 120, and the electromagnetic inducing element, such as an inductor (a common embodiment of the inductor is a metal coil, which is taken as an example in the following), is disposed on the other thereof, such disposition has the function of the generator. For example, the permanent magnet is disposed on the rotor 102 to produce the magnetic field therearound. When the rotor 102 and the moving stator 120 move relatively to each other, the metal coil (not shown) disposed on the moving stator 120 is induced by the change of the magnetic field to produce the current. As shown in FIG. 1, a conductive carbon brush 111 is disposed inside the housing 110 for guiding the current of the metal coil on the moving stator 120 out. In the design of the motor or the generator, the disposition of the magnet and that of the electromagnetic inducing element may be interchangeable to achieve the same effect. Thus, the present invention is not limited to the disposition described above. For example, the metal coil can be disposed on the rotor 102, and the magnet can be disposed at the inner side of the moving stator 120. The relative movement between the moving stator 120 and rotor 102 can also be used to enable the metal coil to produce the current.

Conversely, when the current flows into the metal coil on the moving stator 120 from the outside, the magnetic field will be generated around the metal coil due to the inductor characteristic thereof, thereby producing magnetic mutual interaction with the permanent magnet (not shown) on the rotor 102, which provides torque for the rotor 102 to rotate. The above-mentioned operation is similar to that of the motor.

Please refer to FIG. 1 again. A hydraulic motor 140 is disposed at the left side of the housing 110 and coupled to a gear 122 on the moving stator 120. The hydraulic motor 140 may serve as a brake device for the moving stator 120. For example, the hydraulic motor 140 may constrain the moving stator 120 from a rotation through the gear 122, so that the function of the moving stator 120 is the same as that of the stator described above. The hydraulic motor 140 may also enable the moving stator 120 to rotate in a direction opposite to that of the rotor 102 through the gear 122. When the motor generator apparatus 100 serves as a generator, since the torque provided by the external force causes the rotary shaft 101 to rotate in a certain direction (clockwise direction or counter-clockwise direction), and the hydraulic motor 140 may enable the moving stator 120 to rotate in a direction opposite to that of the rotary shaft 101 through the torque provide by the gear 122, the relative rotating speed between the moving stator 120 and the rotary shaft 101 is increased. If there is a metal coil (inductor) disposed on the moving stator 120, the current produced on the metal coil is certainly increased. The motor generator apparatus 100 of the present invention may utilize the extra power source to enable the moving stator 120 to rotate in a direction opposite to that of the rotary shaft 101. Therefore, the efficiency of power generation is enhanced due to the extra power source.

Under proper manipulation, the motor generator apparatus of the present invention may fully achieve the effect of enhancing power or saving energy according to the driving condition. In the using environment of the rolling stock, the source of torque to rotate the rotary shaft 101 often comes from the rotation of an axle shaft, and the power of the hydraulic motor 140 may come from the hydraulic power provided indirectly by other axle shafts. In the manipulation environment of the gas/electrical energy vehicle, the source of torque to rotate the rotary shaft 101 often comes from the generator or gasoline engine, and it may also come from the rotation of the axle shaft. The power of the hydraulic motor 140 may come from the hydraulic power provided by the gear box.

Since the rotating speed of the hydraulic motor 140 can be manipulated, the output power of the motor generator 100 can be controlled in an ideal state. For example, if the optimal energy conversion power of the motor generator apparatus 100 is 1000 rpm, and the rotating speed of the rotary shaft 101 driven by the axle shaft is 800 rpm, the hydraulic motor 140 is adjusted to enable the moving stator 120 to rotate in an opposite direction at 200 rpm. If the rotating speed of the rotary shaft 101 driven by the axle shaft has reached 1000 rpm, the hydraulic motor 140 is controlled to make the moving stator 120 immovable.

Figure 2:
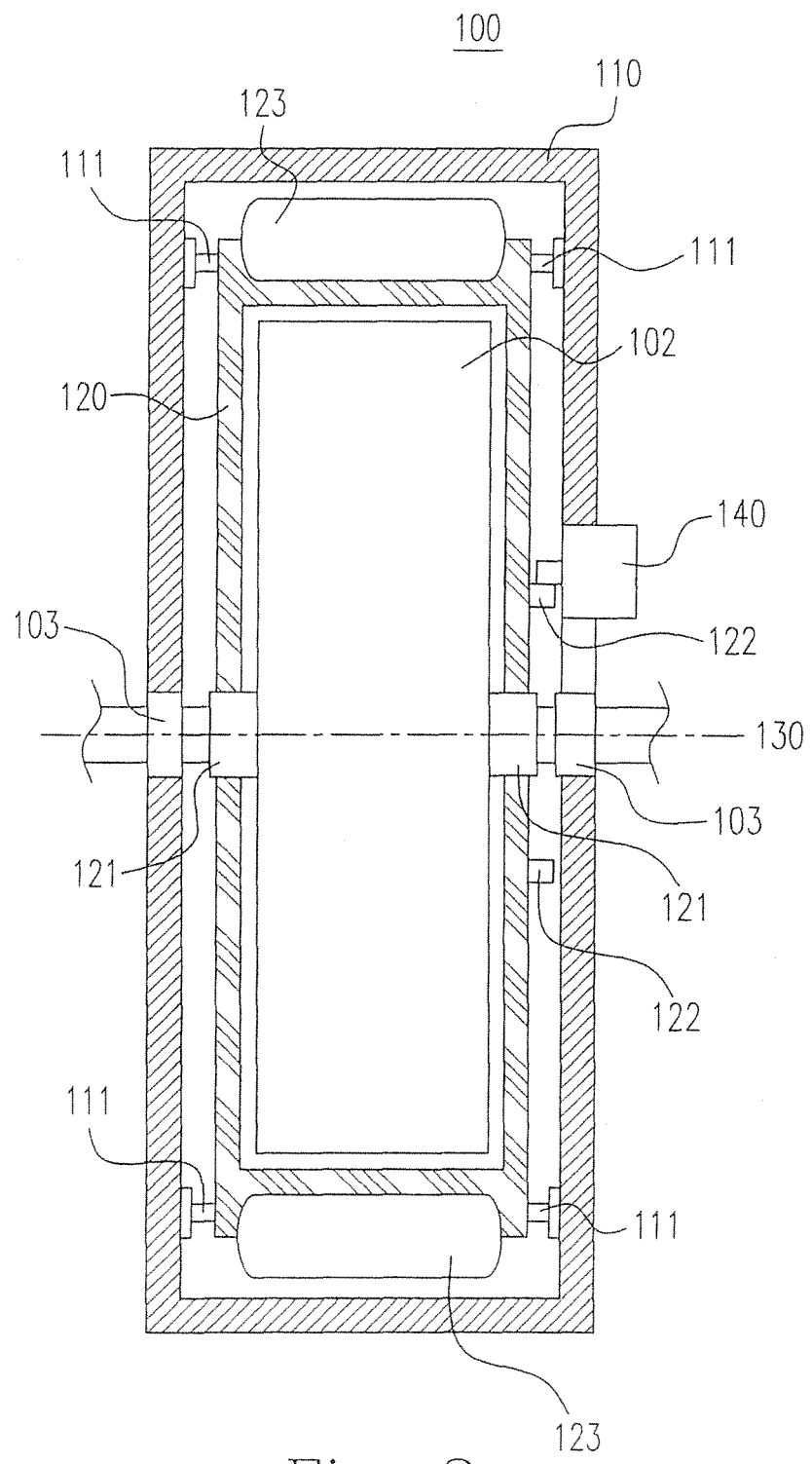
FIG. 2 is a cross-sectional diagram of a motor generator apparatus for vehicles according to another embodiment of the present invention.

Please refer to FIG. 2, which is a cross-sectional diagram of a motor generator apparatus for vehicles according to another embodiment of the present invention. The reference numerals of FIG. 2 are completely identical to those of FIG. 1, wherein the only difference is that the position of the hydraulic motor 140 moves to another side of the housing 110. Thus, the description of FIG. 2 is not repeated here. As shown in FIG. 2, there is a conductive coil 123 on the moving stator 120, and the current may be conducted through the conductive carbon brush 111.

Figure 3:
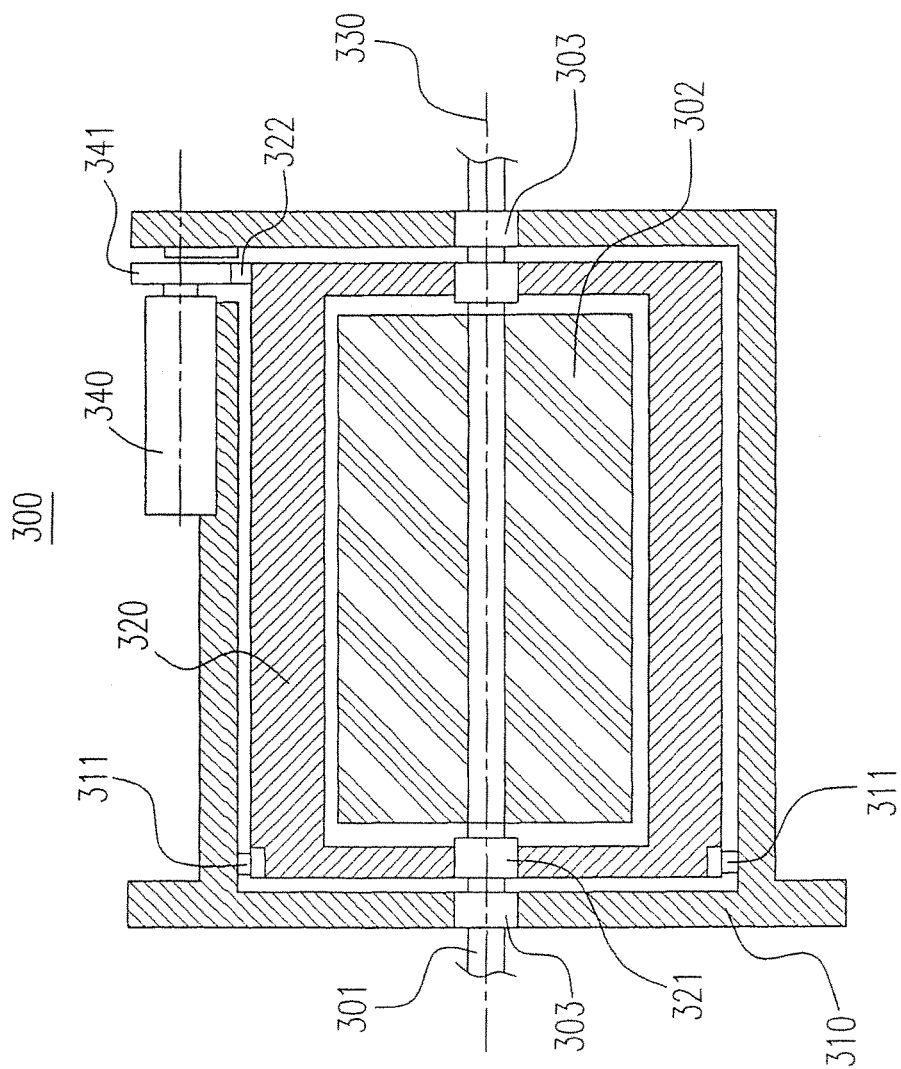
FIG. 3 is a cross-sectional diagram of a motor generator apparatus for vehicles according to a further embodiment of the present invention.

Please refer to FIG. 3, which is a cross-sectional diagram of a motor generator apparatus for vehicles according to a further embodiment of the present invention. As shown in FIG. 3, the motor generator apparatus 300 includes a rotary shaft 301, and a rotor 302 disposed with the rotary shaft 301. The rotary shaft 301 is disposed in a housing 310 through a pair of shaft bearings 303. In the housing 310, a moving stator 320 is disposed on the rotary shaft 301 through a pair of shaft bearings 321. In accordance with a preferred embodiment of the present invention, the above-mentioned element including the rotary shaft 301, the rotor 302, the shaft bearings 303, the moving stator 320 and the shaft bearings 321 are co-axially disposed on a shaft line 330. The skilled person can infer from FIG. 3 that the rotor 302 disposed with the rotary shaft 301 may rotate with the rotary shaft 301, and the moving stator 320 may rotate around the rotary shaft 301 in an identical direction or an opposite direction.

Please refer to FIG. 3 again. A hydraulic motor 340 is disposed at the upper side of the housing 310, and a gear 341 is coupled to the transmission shaft (not shown) of the hydraulic motor 340 and engaged with a gear 322 on the moving stator 320. Similarly, the hydraulic motor 340 may serve as a brake device for the moving stator 320. For example, the hydraulic motor 340 may restrain the moving stator 320 from a rotation through the gear 322, so that the function of the moving stator 320 is the same as that of the stator described above. The hydraulic motor 340 may also enable the moving stator 320 to rotate in a direction opposite to that of the rotor 302 through the gears 341, 322. When the motor generator apparatus 300 serves as a generator, since the torque provided by the external force causes the rotary shaft 301 to rotate in a certain direction (clockwise direction or counter-clockwise direction), and the hydraulic motor 340 may enable the moving stator 320 to rotate in a direction opposite to that of the rotary shaft 301 through the torque provided by the gears 341, 322, the relative rotating speed between the moving stator 320 and the rotary shaft 301 is increased, and the effect thereof is the same as those of the embodiments described above.

Figure 4:
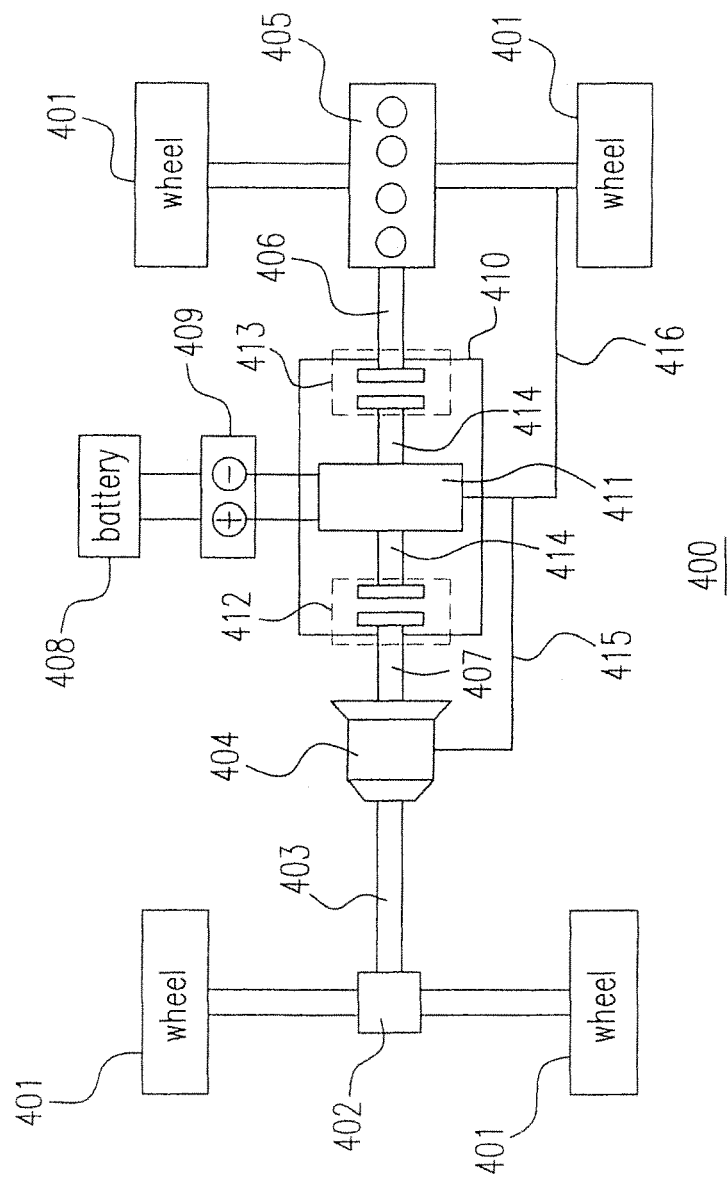
FIG. 4 shows a motor generator apparatus disposed in a gas/electrical hybrid vehicle according to an embodiment of the present invention.

Please refer to FIG. 4, which shows a motor generator apparatus disposed in a gas/electrical hybrid vehicle (or called a gas/electrical energy vehicle) according to an embodiment of the present invention. As shown in FIG. 4, the gas/electrical hybrid vehicle 400 has a typical structure of four wheels 401. The front wheel 401 is coupled to an axle shaft 403 through a differential mechanism 402, another side of the axle shaft 403 is connected to a gear box 404, and a transmission shaft 407 of the gear box 404 is connected to a motor generator module 410. The motor generator module 410 includes a motor generator 411 (which may be chosen from the motor generator 100 or 300 described above), a first clutch 412 and a second clutch 413. An engine 405 (gasoline or diesel engine) transmits the power in a way of torque to the motor generator module 410 through a transmission shaft 406. The motor generator 411 is electrically connected with a battery 408 through a control switch 409. It can be understood by the skilled person that the control switch 409 may choose a power supply mode or a charging mode of the battery, i.e. a motor mode or a generator mode, by switching the circuit. Besides, the gear box 404 provides the hydraulic power to the motor generator 411 through a hydraulic oil circuit 415, and other axle shafts may also provide the hydraulic power to the motor generator 411 through a hydraulic oil circuit 416.

When the engine 405 is turned on to warm up the car or is idling, the first clutch 412 separates the transmission shaft 407 from the motor generator module 410, and the second clutch 413 couples the transmission shaft 406 to the motor generator module 410. This enables the motor generator 411 to utilize the mechanical energy (torque) from the transmission shaft 406 to produce electrical energy for charging the battery 408.

As the vehicle is running on the plane road, the first clutch 412 couples the transmission shaft 407 to the motor generator module 410, and the second clutch 413 couples the transmission shaft 406 to the motor generator module 410. The torsion output from the engine 405 is sent to the wheel through a series of coupled transmitting elements, the gear box 404, the axle shaft 403 and then the differential 402 in turn. The redundant hydraulic power produced by the gear box 404 may be transmitted to the motor generator 411 through the hydraulic oil circuit 415, which drives the moving stator (not shown) in the motor generator 411 to rotate in a direction opposite to that of the rotary shaft (not shown), thereby enhancing the efficiency of power generation. If a motor is chosen to be the power, the first clutch 412 separates the transmission shaft 407 from the motor generator module 410, and the axle shaft 403 receives a torsion or torque which is the mechanical energy obtained by converting the electrical energy provided by the battery 408 via the motor generator 411. This provides a driving power for the wheel 401. The redundant hydraulic power produced by the gear box 404 may be transmitted to the motor generator 411 through the hydraulic oil circuit 415, which drives the moving stator (not shown) in the motor generator 411 to rotate in a direction opposite to that of the rotary shaft (not shown), thereby enhancing the efficiency of the motor.

As the vehicle is running on the downhill path or in a slowdown status, the change of the potential energy during the downhill process increases the speed of the vehicle; at this time, the energy produced by the rotation of the wheel may provide the hydraulic power to the motor generator 411 through the hydraulic oil circuit 416, which drives the moving stator (not shown) in the motor generator 411 to rotate in a direction opposite to that of the rotary shaft (not shown), thereby enhancing the efficiency of power generation.

If extra power is needed, e.g. on the uphill path or in an acceleration status, the motor generator module 410 connected in series with the transmission shafts 406, 407 may utilize the power of the battery to provide the extra power to the vehicle so that the deficiency of the engine 405 is complemented.

Embodiments

1. An electrical apparatus, comprising:
    a first rotation device;
    a second rotation device co-axially disposed with the first rotation device for electromagnetically matching with each other; and
    a brake device connected to the second rotation device to constrain the second rotation device from a rotation.
2. The electrical apparatus of Embodiment 1, wherein the first rotation device comprises a magnetic element, and the second rotation device comprises an inductor.
3. The electrical apparatus of any one of Embodiments 1-2, wherein the first rotation device rotates around a first rotating direction, and when the brake device is at a first brake status, the second rotation device has a second rotating direction opposite to the first rotating direction.
4. The electrical apparatus of any one of Embodiments 1-3, wherein when the brake device is at a second brake status, the second rotation device is constrained from the rotation.
5. The electrical apparatus of any one of Embodiments 1-4, wherein the magnetic element includes a permanent magnet.
6. The electrical apparatus of any one of Embodiments 1-5, wherein the inductor includes a coil.
7. The electrical apparatus of any one of Embodiments 1-6, further comprising a gear box, wherein the brake device is controlled by a hydraulic power provided by the gear box.
8. An electrical apparatus, comprising:
    a first rotation device;
    a second rotation device co-axially disposed with the first rotation device for electromagnetically matching with each other; and
    a hydraulic device controlling the second rotation device.
9. The electrical apparatus of Embodiment 8, wherein the electrical apparatus is disposed in a vehicle having a transmission shaft and an axle shaft, and the electrical apparatus is coupled to the transmission shaft and the axle shaft.
10. The electrical apparatus of any one of Embodiments 8-9, further comprising a gear box, wherein the hydraulic device is controlled by a hydraulic power provided by the gear box.
11. The electrical apparatus of any one of Embodiments 8-10, wherein the first rotation device comprises a first magnetic element, and the second rotation device comprises a second magnetic element.
12. The electrical apparatus of any one of Embodiments 8-11, wherein when the first magnetic element includes a magnet, the second magnetic element includes an inductor.

13. The electrical apparatus of any one of Embodiments 8-12, wherein when the first magnetic element includes an inductor, the second magnetic element includes a magnet.

14. An electrical apparatus, comprising:
   a first rotation device;
   a second rotation device co-axially disposed with the first rotation device for electromagnetically matching with each other; and
   a control device controlling the second rotation device at one of a stop status and a rotating status.

15. The electrical apparatus of Embodiment 14, wherein the stop status is controlled by a hydraulic power.

16. The electrical apparatus of any one of Embodiments 14-15, wherein the rotating status is controlled by a hydraulic power.

17. The electrical apparatus of any one of Embodiments 14-16, wherein the first rotation device comprises a first magnet element, and the second rotation device comprises a second magnetic element.

18. The electrical apparatus of any one of Embodiments 14-17, wherein when the first magnetic element includes a magnet, the second magnetic element includes an inductor.

19. The electrical apparatus of any one of Embodiments 14-18, wherein when the first magnetic element includes an inductor, the second magnetic element includes a magnet.

The motor generator apparatus of the present invention designs the stator of the conventional motor or generator as a moving stator which rotates around the rotor and is co-axially disposed therewith. This enables the rotor and the stator to rotate in opposite directions so that the mutual interaction resulting from the magnetic field is increased, thereby enhancing the efficiency of the motor generator apparatus.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electrical apparatus for a transportation vehicle, comprising:
   an electromagnetic motor, wherein the electromagnetic motor comprises:
      a first rotation device; and
      a second rotation device co-axially disposed with the first rotation device for electromagnetically matching with each other, wherein the electromagnetic motor operates in one of a motor mode and a generator mode; and
      a hydraulic device controlling the second rotation device; and
      a gear box providing a hydraulic power to the electromagnetic motor by the hydraulic device,
   wherein in the motor mode, the electromagnetic motor receives a first electric power to generate a magnetic field in the second rotation device to induce a first rotation of the first rotation device, and the hydraulic device drives a second rotation of the second rotation device in a direction opposite to the first rotation; and
   wherein in the generator mode, the electromagnetic motor produces a second electrical power generated by the electromagnetic field caused by a third rotation of the first rotation device, and the hydraulic device drives a fourth rotation of the second rotation device in a direction opposite to the third rotation.

2. An electrical apparatus as claimed in claim 1, wherein the transportation vehicle having a transmission shaft and an axle shaft, and the electrical apparatus is coupled to the transmission shaft and the axle shaft, further comprising:
   a control switch configured to operate the electromagnetic motor in one of the motor mode and the generator mode;
   a battery electrically coupled to the second rotation device through the control switch;
   a first clutch coupled between the electromagnetic motor and the gear box; and
   a second clutch, wherein the first rotation device is configured to be mechanically coupled to the axle shaft through the first clutch and the gear box, and the first rotation device is configured to be mechanically coupled to the transmission shaft through the second clutch.

3. An electrical apparatus as claimed in claim 1, wherein the first rotation device comprises a first magnetic element, and the second rotation device comprises a second magnetic element.

4. An electrical apparatus as claimed in claim 3, wherein when the first magnetic element includes a magnet, the second magnetic element includes an inductor.

5. An electrical apparatus as claimed in claim 3, wherein when the first magnetic element includes an inductor, the second magnetic element includes a magnet.

6. An electrical apparatus, comprising:
   a first rotation device;
   a second rotation device co-axially disposed with the first rotation device for directly electromagnetically matching with each other without another coaxial rotation device wherein at least one of a first rotation of the first rotation device and a second rotation of the second rotation device produces an electromagnetic induction effect between the first rotation device and the second rotation device; and
   a control device controlling the second rotation device at one selected from a group consisting of a stop status controlled by a hydraulic power, and a first rotating status and a second rotating status, wherein at the first rotating status and the second rotating status, the second rotation device rotates in opposite direction.

7. An electrical apparatus as claimed in claim 6, wherein the stop status, the first rotating status and the second rotation status are controlled by a hydraulic power.

8. An electrical apparatus as claimed in claim 6, wherein the first rotation device comprises a first magnetic element, and the second rotation device comprises a second magnetic element.

9. An electrical apparatus as claimed in claim 8, wherein when the first magnetic element includes a magnet, the second magnetic element includes an inductor.

10. An electrical apparatus as claimed in claim 8, wherein when the first magnetic element includes an inductor, the second magnetic element includes a magnet.

* * * * *